United States Patent [19]

Tsutsumi et al.

[11] Patent Number: 4,488,161
[45] Date of Patent: Dec. 11, 1984

[54] ELECTROSTATIC RECORDING HEAD, A METHOD FOR MANUFACTURING THE SAME, AND AN APPARATUS FOR PRACTICING THIS METHOD

[75] Inventors: Teruo Tsutsumi; Masao Hori, both of Tokyo, Japan

[73] Assignee: Tokyo Shibaura Denki Kabushiki Kaisha, Japan

[21] Appl. No.: 368,089

[22] Filed: Apr. 13, 1982

[30] Foreign Application Priority Data

Apr. 15, 1981 [JP] Japan .................................. 56-55687
Jul. 20, 1981 [JP] Japan ................................. 56-112096
Jul. 20, 1981 [JP] Japan ................................. 56-112097
Jul. 29, 1981 [JP] Japan ................................. 56-117630

[51] Int. Cl.$^3$ ........................................... G01D 15/06
[52] U.S. Cl. ................................................... 346/155
[58] Field of Search ......................................... 346/155

[56] References Cited

U.S. PATENT DOCUMENTS 3,611,419 10/1971 Blumenthal .
3,653,065 3/1972 Brown, Jr. .
3,693,185 9/1972 Lloyd .............................. 346/155 X
3,903,594 9/1975 Koneval ........................... 346/155 X
4,219,927 9/1980 Fukutomi et al. ............... 346/155 X

FOREIGN PATENT DOCUMENTS 2137371 3/1972 Fed. Rep. of Germany .
2838241 3/1979 Fed. Rep. of Germany .

Primary Examiner—Thomas H. Tarcza
Attorney, Agent, or Firm—Cushman, Darby & Cushman

[57] ABSTRACT

An electrostatic recording head has a plurality of electrode wires arranged parallel to each other at a predetermined pitch to form recording electrodes at one ends thereof, control electrodes arranged along these recording electrodes, and a recording electrode retainer for integrally fixing these electrodes with a resin. The other ends of these electrode wires are integrally fixed by an electrode wire terminal end retainer of a resin. The electrode wires are electrically connected to a part of the conductive pattern formed on a printed circuit board interposed between both retainers, and are grouped thereby to form a plurality of recording electrode set conductors. These conductors and lead wires connected to the control electrodes are connected to connector terminals. A recording voltage is applied to the connector terminals.

7 Claims, 15 Drawing Figures

FIG. 8

ELECTROSTATIC RECORDING HEAD, A METHOD FOR MANUFACTURING THE SAME, AND AN APPARATUS FOR PRACTICING THIS METHOD

BACKGROUND OF THE INVENTION

The present invention relates to an electrostatic recording system and, more particularly, to a multistylus type electrostatic recording head which is suitable for recording of image signals for a facsimile, printer or the like, a method for manufacturing the same, and an apparatus for practicing this method.

Various multistylus type electrostatic recording heads are known for electronically scanning image signals to be recorded. An electrostatic recording head for a facsimile is generally of a multistylus type wherein a number of recording electrodes which hold one-to-one correspondence with all the picture elements corresponding to one scanning line are arranged in an array in an insulator such as an epoxy resin mold. Auxiliary electrodes arranged on the front or back surface side of the recording medium closely contacted with the recording head help to perform electronic scanning of image signals of a recording medium.

FIG. 1 is a schematic perspective view of a conventional electrostatic recording head of the single surface control type wherein recording electrodes and auxiliary electrodes are arranged on the same surface with respect to the recording medium. A number of recording electrodes 10 are independently embedded at a pitch of several electrodes per milimeter in an electrode retainer 12 of an insulator such as an epoxy resin. Front ends of the recording electrodes 10 are exposed to the surface of the retainer 12. Auxiliary electrodes 14 are also embedded in the electrode retainer 12 at both sides of the recording electrodes 10 and on the same plane as the recording electrodes 10. The auxiliary electrodes 14 are also exposed to the surface of the retainer 12. The auxiliary electrodes 14 divide the recording electrodes 10 into groups of equal numbers and are arranged in correspondence with the respective groups. The auxiliary electrodes 14 serve to control the recording positions of the recording electrodes 10 and are thus also called control electrodes. Electrostatic recording is performed by dividing a recording voltage into two voltages which are applied to the recording electrodes 10 and the control electrodes 14. Then, recording is performed only at positions on an electrostatic recording paper sheet 16 where both voltages are applied simultaneously.

The recording mechanism of the electrostatic recording head of the single surface type of the electrode arrangement as described above will now be described with reference to FIG. 2. Referring to FIG. 2, a number of recording electrodes 10 are divided into a number of electrode groups each consisting of m recording electrodes 10. Then, the recording electrodes at the same positions in every other group are connected to each other to provide two systems GA and GB of electrode groups. The recording electrodes of each electrode group are arranged to extend from the center of the corresponding control electrode 14 to the center of the adjacent control electrode 14. With the electrode arrangement shown in FIG. 2, if the numbers of the recording electrodes 10 and the control electrodes 14 are respectively N and M, the following relation is held:

$$M = (N/m) + 1$$

Electrostatic recording is simultaneously performed with m recording electrodes of each group. The control electrodes 14 are used to select the electrode groups for recording. More specifically, referring to FIG. 2, in order to record with a first electrode group G-1, 0 V and a high voltage such as −300 V which alone may not effect formation of an electrostatic latent image are applied, in accordance with the pattern to be recorded, to the system GA of the electrode groups. Simultaneously, a voltage which has substantially the same absolute value as the above-mentioned voltage and which has the opposite polarity thereto, for example +300 V, is applied to the first and second control electrodes of a system GC of the control electrodes 14. Then, a potential difference of 600 V or 300 V is established between the recording electrodes of the first electrode group G-1 and the electrostatic recording paper sheet (not shown). An electrostatic latent image is formed on the surface of the electrostatic recording paper sheet immediately below the recording electrodes at which the potential difference of 600 V is established. Next, the system GB of the recording electrodes is driven while applying a voltage to the second and third control electrodes. Thus, recording with the second electrode group G-2 is performed. Thereafter, scanning and recording of one line is performed by applying a voltage to two control electrodes while shifting one control electrode at a time and while alternately driving the system GA and GB of electrode groups.

In this manner, the recording electrode groups are divided into two systems and are alternately driven. Two control electrodes are simultaneously driven. This is to prevent a drop in the potential distribution of the electrostatic recording paper sheet 16 at the edges of the control electrodes 14 as indicated by the dotted lines in FIG. 3. With this arrangement, a substantially flat potential distribution as indicated by a solid line is obtained even at the edges of the control electrode 14. Then, an electrostatic latent image which is uniform in the scanning direction can be formed. In the arrangement shown in FIG. 1, the control electrodes 14 are arranged at both sides and in the vicinities of the recording electrodes 10. This is also for the purpose of obtaining a flat potential distribution of the electrostatic recording paper sheet 16 at the positions of the recording electrodes 10. Referring to FIG. 1, the control electrodes 14 at both sides of one recording electrode 10 are commonly connected.

FIG. 4 schematically shows the structure of a conventional electrostatic recording head having the electrode arrangement shown in FIG. 2. Referring to FIG. 4, electrode wires 18 corresponding to the recording electrodes shown in FIGS. 1 and 2 comprise, for example, nickel wires having a diameter of 0.04 to 0.1 mm and covered with a polyurethane layer. One ends each of the electrode wires 18 are embedded in a rod-shaped electrode retainer 12 of an insulator such as an epoxy resin. One ends of these electrode wires 18 are exposed to the surface of the retainer 12 in the longitudinal direction thereof to constitute the recording electrodes 10. The electrode wires 18 correspondent to each recording electrode 10 are divided into electrode groups each consisting of m electrodes. The electrode wires 18 at the same positions in each electrode group are commonly connected to define electrode wire sets 20 numbering 2m. Each electrode wire set 20 belongs to either of the systems GA and GB of the recording electrode groups. The electrode wire sets 20 are connected to the upper portion of a printed circuit board 22 to be connected to a recording electrode drive circuit (not shown) through connectors 24. High voltage pulses are thus applied to the electrode wire sets 20 in accordance with the image signals to be recorded.

Meanwhile, the control electrodes 14 of rectangular shape are embedded in the electrode retainer 12 in a similar manner to that of the recording electrodes 10. One ends each of the control electrodes 14 are arranged close to both sides of the associated recording electrodes and within the same plane of the recording electrodes. The control electrodes 14 are connected to the front and back surfaces of the printed circuit board 22 through lead wires 26, respectively. The control electrodes 14 of each pair opposing each other with the associated recording electrode therebetween are commonly connected by through holes. The control electrodes 14 are connected to a control electrode drive circuit (not shown) through the connectors 24 of the printed circuit board 22. Thus, high voltage pulses of opposite polarity to that of a voltage applied to the recording electrodes are applied to these control electrodes so as to control the recording position.

Although not shown in the figure, the electrode retainer 12 and the printed circuit board 22 are fixed by a casing to constitute an electrostatic recording head unit.

With a conventional electrostatic recording head of the configuration as described above, wiring of the recording electrodes or electrode wires is extremely complex. Specifically, the electrode wires 18 constituting the recording electrodes 10 shown in FIG. 4 must be grouped and those at the same positions of each group must be commonly connected to form the electrode wire sets 20. During such operation, it is extremely difficult to correctly group a great number of thin electrode wires according to their positions and orders. Moreover, connection of the electrode wires during wiring of the electrode wire sets is not easy either. Manufacture of such an electrostatic recording head thus requires much skill, and inspection and correction of erroneous connection is also extremely difficult.

The electrode wires 18 are arranged in a very complex manner and are in contact with each other after formation of the electrode wire sets 20. Although these electrode wires 18 are insulated, relatively high voltages applied to them can invite dielectric breakdown. Impact or vibration can also cause damage to them. The conventional electrostatic recording head as described above thus has problems of stability and reliability.

Another electrostatic recording head is also known which utilizes a printed circuit board of a different configuration. This printed circuit board is obtained by forming by photoetching on a copper-plated laminate, recording electrodes which are formed by photoetching, and a matrix circuit for forming electrode sets by commonly connecting the recording electrodes at the same positions of a number of electrode groups. With this arrangement, a highly advanced technique is required in order to manufacture recording electrodes which are arranged at a high pitch. The manufacturing yield of such heads is low and manufacturing cost is high. Since the recording electrodes are formed by photoetching a copper-plated laminate, the recording electrodes become smaller than those formed from electrode wires of the prior art as described above. The recording electrodes also become asymmetrical with respect to the center (for example, trapezoidal). When such recording electrodes are used for facsimile or the like, recording reliability and density are degraded.

As has been described above, in the conventional head shown in FIG. 1, the control electrodes 14 are embedded and exposed through the electrode retainer 12 together with the recording electrodes 10. These control electrodes 14 are manufactured in the manner as shown in FIG. 5. Specifically, a square bar 28 is milled to form teeth 30. The lead wires 26 are connected to these teeth 30 to form a control electrode element. A pair of control electrode elements is prepared. This pair of control electrode elements is integrally formed with a resin with electrode wires or recording electrodes therebetween. Thereafter, the integral body obtained is cut at dotted lines in FIG. 5.

With such a manufacturing method, milling takes time and increases the number of manufacturing steps, so that the manufacturing cost is increased.

SUMMARY OF THE INVENTION

It is an object of the present invention to provide a electrostatic recording head with a novel structure which is easy to manufacture, a method for manufacturing the same, and an apparatus for practicing this method.

It is another object of the present invention to provide an electrostatic recording head with improved reliability and stability, a method for manufacturing the same, and an apparatus for practicing this method.

It is still another object of the present invention to provide an electrostatic recording head which does not require a highly advanced printed circuit board manufacturing technique and which is excellent in recording characteristics, a method for manufacturing the same and an apparatus for practicing this method.

It is still another object of the present invention to provide an electrostatic recording head which is inexpensive to manufacture, a method for manufacturing the same, and an apparatus for practicing this method.

The above and other objects have been attained by an electrostatic recording head which comprises: a recording electrode retainer in which a plurality of electrode wires are arranged parallel to each other at a predetermined pitch, said plurality of electrode wires constituting recording electrodes at one ends each thereof, in which control electrodes are arranged along said recording electrodes, and in which said recording electrodes and said control electrodes are integrally formed and fixed with a resin; an electrode wire terminal end retainer of a resin for fixing the other ends of said electrode wires at a pitch the same as the pitch of said recording electrodes; and a printed circuit board interposed between said recording electrode retainer and said electrode wire terminal end retainer, on said printed circuit board being formed electrode wire connecting lands at positions corresponding to said electrode wires, conductors for forming recording electrode sets by connecting said electrode wire connecting lands corresponding to said electrode wires of said recording electrodes at the same relative positions in a plurality of groups of said electrode wire connecting lands formed in correspondence with groups of said recording electrodes, and lead wire connecting lands to be connected to lead wires which are, in turn, connected to said control electrodes, said printed circuit board having connector terminals to be connected to said recording electrode set conductors and said lead wire connecting lands, said electrode wires being connected to corresponding ones of said electrode wire connecting lands, and said lead wires being connected to corresponding ones of said lead wire connecting lands.

With the arrangement of the present invention as described above, the following advantages are obtained as compared with the conventional apparatus.

The arrangement of the printed circuit board and the electrode wires constituting the recording electrodes is orderly and suitable for automatic operation. Therefore, most part of the work which has been conventionally manually performed can be automatically performed, resulting in significant labor savings. Furthermore, the arrangement of the present invention does not involve irregular wiring, so that erroneous wiring may be reduced to the minimum and wiring inspection may be simplified. The electrode wires are all fixed to the printed circuit board in an orderly manner and the terminal ends of the electrode wires are fixed to the electrode wire terminal end retainer. Thus, the electrode wires do not cross each other as in the conventional arrangements. Therefore, the dielectric breakdown may not be caused, and damage due to vibration and impact may be reduced to the minimum. With these advantages, an electrostatic recording head which is improved in reliability and stability is provided. Furthermore, since the terminal ends of a number of electrode wires are retained by the electrode wire terminal end retainer, handling of the terminal ends of the electrode wires is simpler than with the conventional arrangements. A conventional electrostatic recording head uses a printed circuit board on which recording electrodes and a matrix circuit are simultaneously formed by photoetching a copper-plated laminate. In comparison with this conventional electrostatic recording head, an electrostatic recording head of the present invention uses a printed circuit board which does not require advanced manufacturing techniques. Therefore, with the arrangement of the present invention, the manufacturing cost is lower, and the recording quality and density are improved since recording electrodes have circular cross-sectional shapes of constant size.

BRIEF DESCRIPTION OF THE DRAWINGS

By way of example and to make the description clearer, reference is made to the accompanying drawings in which.

DETAILED DESCRIPTION OF THE PREFERRED EMBODIMENTS

Figure 6:
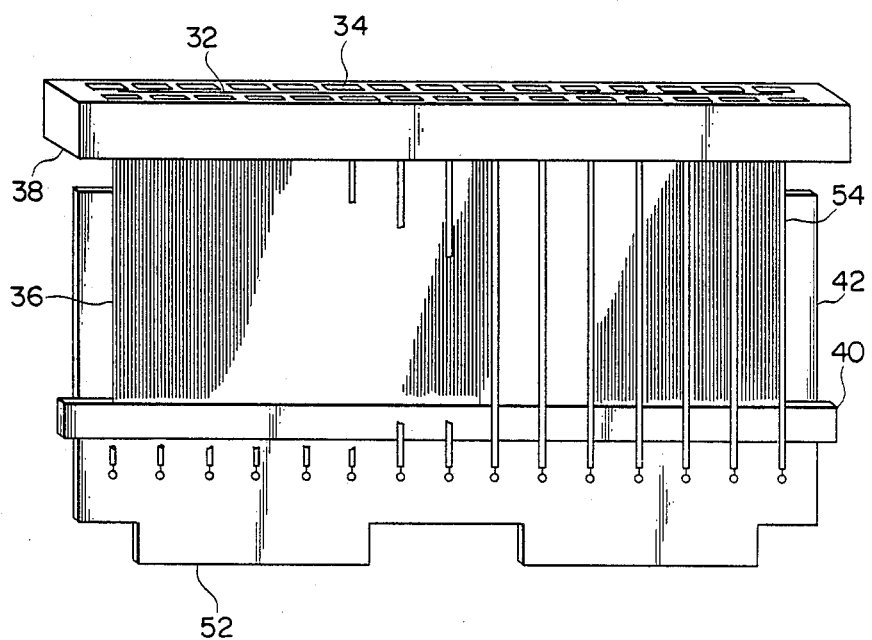
FIG. 6 is a schematic perspective view showing the arrangement of an electrostatic recording head of the single surface control type according to the first embodiment of the present invention.

The preferred embodiments of the present invention will now be described with reference to the accompanying drawings. FIG. 6 is a schematic perspective view of an electrostatic recording head according to the first embodiment of the present invention. The arrangement and wiring of recording electrodes 32 and control electrodes 34 of the electrostatic recording head shown in FIG. 6 are the same as those of the conventional head shown in FIG. 2.

Electrode wires 36 shown in FIG. 6 are obtained by coating wires of copper, nickel or phosphor bronze and of 0.04 to 0.1 mm diameter with a uniform insulating film of 5 to 20 μm thickness and of formal, polyurethane or polyester. One ends each of these electrode wires 36 are embedded in a rod-shaped electrode retainer 38 of an insulator such as an epoxy resin. End faces of the electrode wires 36 are exposed to the surface of the electrode retainer 38 in an array at a predetermined pitch (0.06 to 0.2 mm) along the longitudinal direction of the retainer, thereby defining the recording electrodes 32. The recording electrodes 32 are thus positioned to be brought into contact with a recording medium. As will be described in further detail later, the other ends of the electrode wires 36 are completely embedded in an electrode wire terminal retainer 40 of the same insulator as that of the electrode retainer 38 or a similar insulator at the same pitch as that of the recording electrodes 36. The other ends of the electrode wires 36 are not exposed to the surface of the electrode wire terminal retainer 40. The electrode wires 36 between the electrode retainer 38 and the electrode wire terminal end retainer 40 extend at the same pitch as that of the recording electrodes as shown in FIG. 6 and are respectively electrically connected to predetermined positions of a printed circuit board 42.

Figure 1:
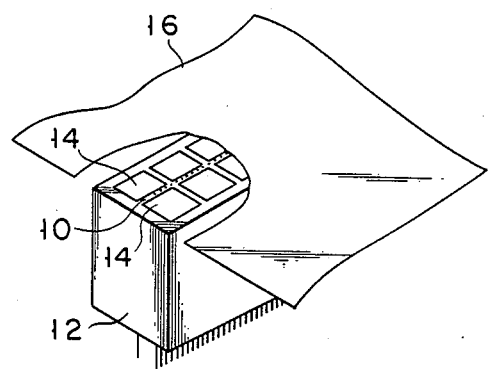
FIG. 1 is a schematic perspective view of part of a conventional electrostatic recording head of the single surface control type.
Figure 2:
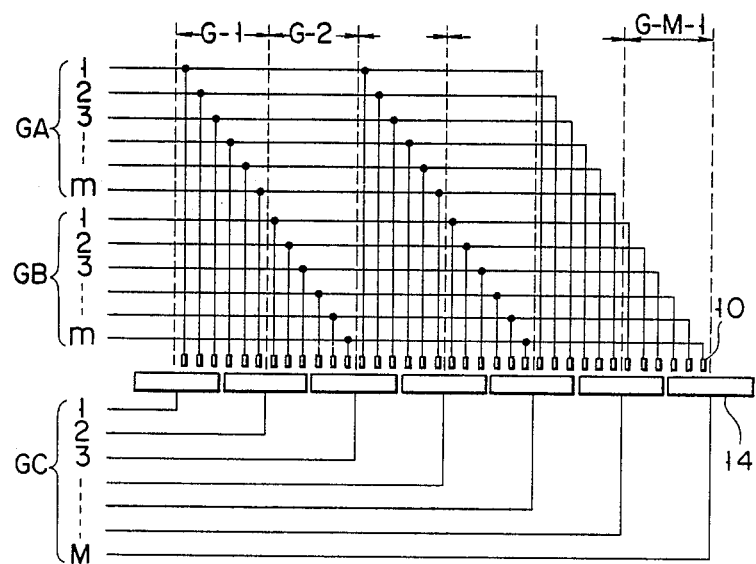
FIG. 2 is a view showing the arrangement of the electrodes of the electrostatic recording head shown in FIG. 1.
Figure 3:
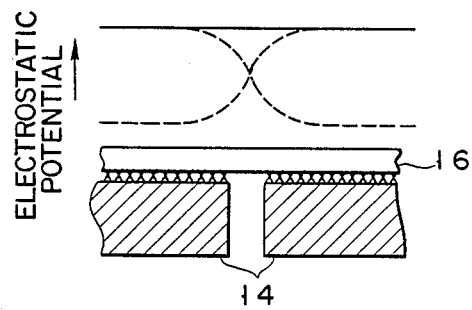
FIG. 3 is a view showing the mode of operation of the control electrodes shown in FIG. 2.
Figure 4:
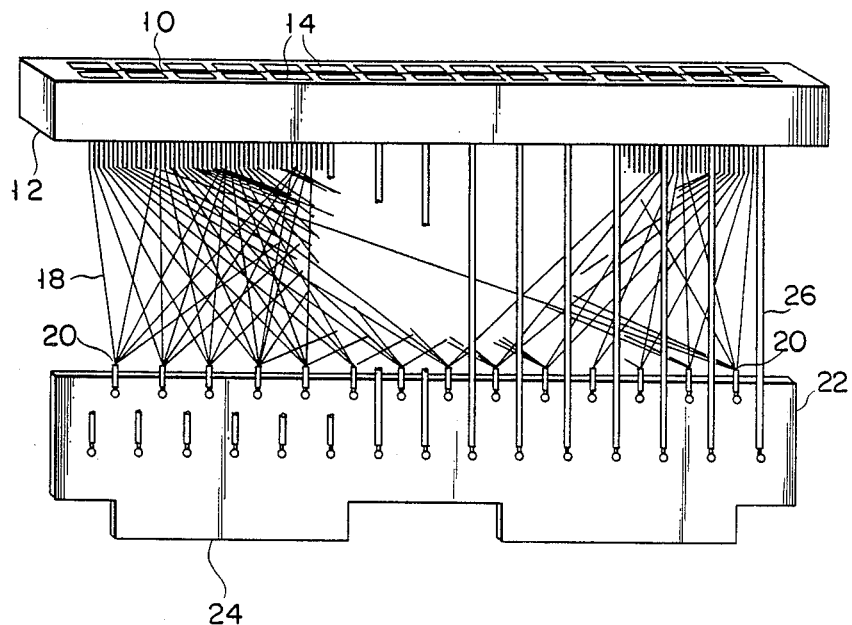
FIG. 4 is a schematic perspective view showing the arrangement of the conventional electrostatic recording head of the single surface control type.
Figure 5:
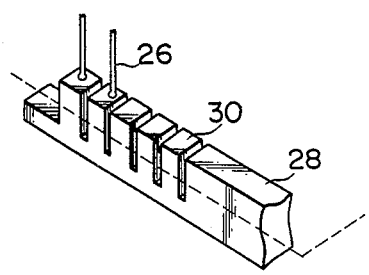
FIG. 5 is a view for explanation of the manufacturing method of the control electrodes.

The printed circuit board 42 is used to realize the arrangement of the recording electrodes of the electrostatic recording head shown in FIG. 2. Specifically, the recording electrodes 32 are divided into a number of electrode groups each consisting of m recording electrodes; wiring for connecting the recording electrodes 32 at the same positions in every other electrode group to provide two systems GA and GB of recording electrodes is formed by photoetching a copper-plated laminate.

The printed circuit board 42 will be described in further detail with reference to FIG. 7.

Figure 7:
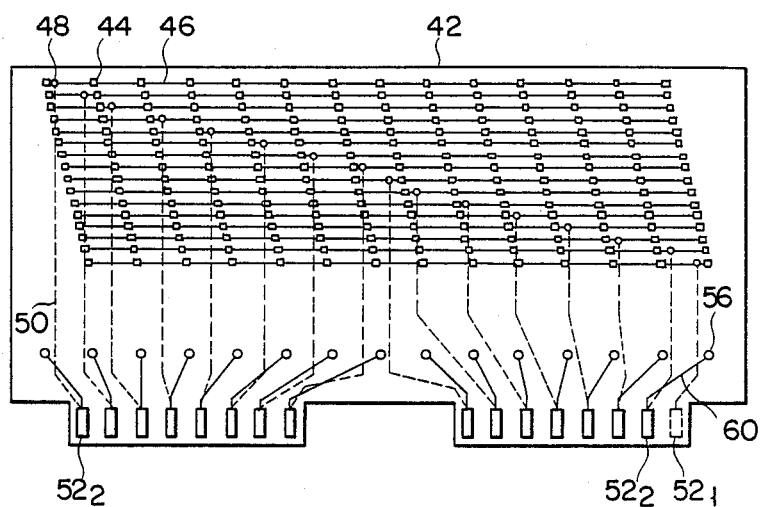
FIG. 7 is a schematic view showing a printed circuit board used in the head shown in FIG. 6.

Electrode wire connecting lands 44 for electrically connecting the electrode wires 36 shown in FIG. 7 are formed at a constant pitch and in a staggered form in correspondence with the recording electrodes 32 or the electrode wires 36 to facilitate grouping thereof. These electrode wire connecting lands 44 are arranged parallel to an array of recording electrodes and are arranged in arrays each consisting of a predetermined number, for example, twice the number m of the recording electrodes in the electrode group or 2m. The electrode wire connecting lands 44 are connected by conductors 46 so as to connect the recording electrodes or electrode wires 36 at the same relative positions in every other recording electrode group. The recording electrode sets defined by these conductors 46 are connected to a recording electrode drive circuit which supplies thereto a high voltage pulse corresponding to an image signal to be recorded, as has been described above. These conductors 46 are electrically connected to conductors 50 at the rear surface of the board via through holes 48 formed at parts of the electrode wire connecting lands 44 or parts of the conductors 46. The conductors 50 are then connected to connectors $52_1$ for connection with the recording electrode drive circuit (not shown). The printed circuit board 42 further has lead wire connecting lands 56 for connecting lead wires 54 to be connected to the control electrode 34, and conductors 60 for connecting lands 56 to connectors $52_2$. The control electrodes 34 are embedded in the electrode retainer 38 shown in FIG. 6 and exposed to the same surface of the recording electrodes, so as to control the recording positions of the recording electrodes.

Figure 8:
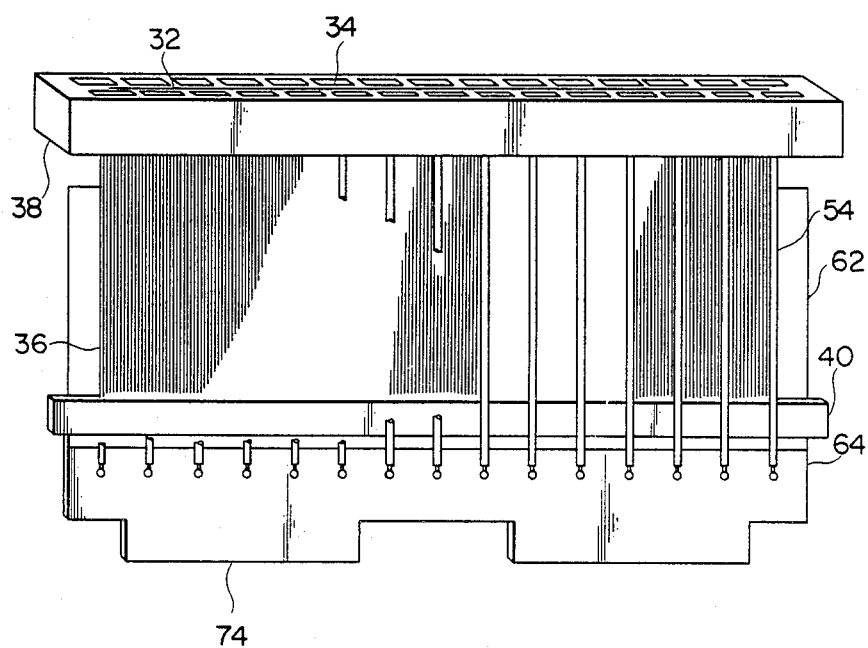
FIG. 8 is a schematic perspective view showing the arrangement of an electrostatic recording head of the single surface control type according to the second embodiment of the present invention.

Referring to FIG. 7, a description has been made on the printed circuit board 42 which integrally incorporates the connectors, the matrix circuit for grouping the recording electrodes and the lead wire connecting lands for the control electrodes. However, they may be of separate arrangements. For example, as shown in FIG. 8, a flexible printed circuit board 62 may be provided for the matrix circuit, and a rigid printed circuit board 62 may be provided for the rest of the circuitry. These two printed circuit boards may then be integrally formed for electrical connection therebetween. FIG. 8 shows a schematic perspective view of an electrostatic recording head of this type, and FIG. 9 shows a schematic view of the flexible printed circuit board used for the electrostatic recording head shown in FIG. 8.

Figure 9:
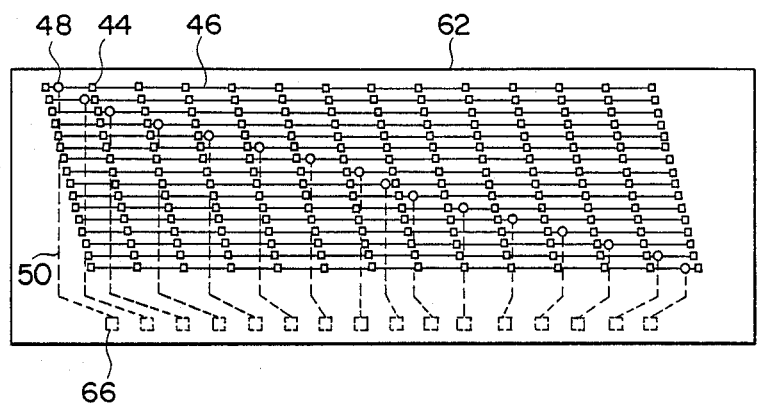
FIG. 9 is a schematic view showing a flexible printed circuit board used in the head shown in FIG. 8.
Figure 10:
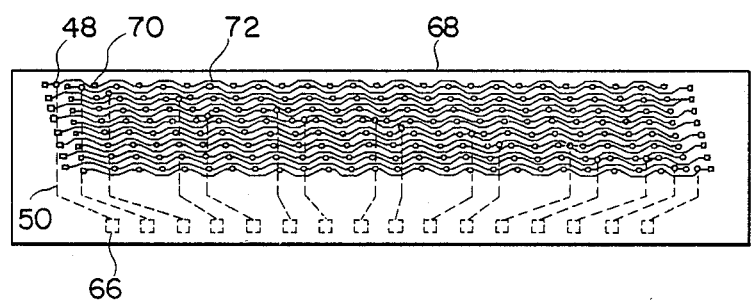
FIG. 10 is a schematic view showing a modification of the flexible printed circuit board shown in FIG. 9.

The flexible printed circuit board 62 shown in FIG. 9 is made of a flexible laminate of polyester, polyimide, glass epoxy with a thickness of 25 to 125 μm. The configuration of this printed circuit board 62 consisting of the lands 44, the conductors 46 and the conductors 50 is the same as that of the printed circuit board 42 shown in FIG. 7 except for terminals 66. A printed circuit board 68 as shown in FIG. 10 may alternatively be provided wherein the number of electrode wire connecting lands in an array equals m, the number of the recording electrodes in one electrode group, in order to make the size of the board along the direction of the electrode wires smaller and to thereby obtain a more compact electrostatic recording head. Referring to FIG. 10, every other electrode wire connecting lands 70 in each array are commonly connected by conductors 72. The terminals 66 are used for electrical connection of the flexible printed circuit board 62, 68 with the rigid printed circuit board 64 having the connectors and the lead wire connecting lands. The flexible printed circuit board 62, 68 and the rigid printed circuit board 64 have terminals of substantially the same number and shape, and are electrically connected to each other by mutual contact, adhesion with an electrically conductive adhesive, or soldering. The flexible printed circuit board is used due to ease in manufacture.

Figure 11:
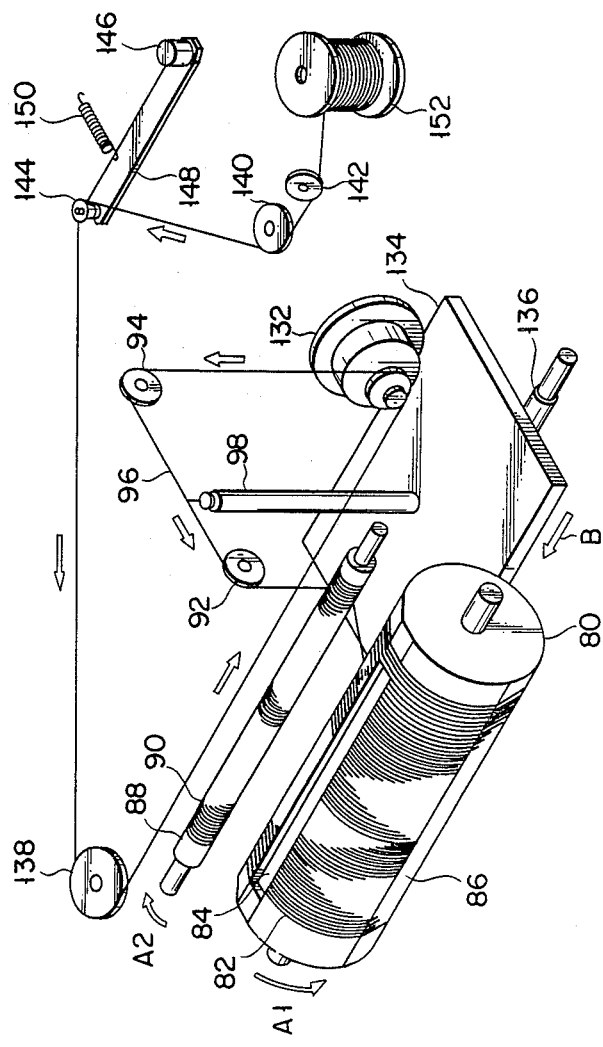
FIG. 11 is a schematic view showing an apparatus for manufacturing the electrostatic recording head shown in FIG. 8, according to the third embodiment of the present invention.
Figure 12:
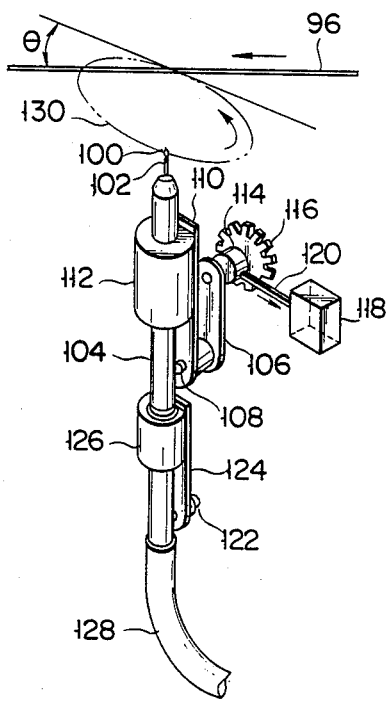
FIG. 12 is a schematic perspective view of an insulating film removing apparatus shown in FIG. 11.

FIG. 11 shows an embodiment of an apparatus for manufacturing the electrostatic recording head shown in FIG. 8. On the outer circumferential surface of a metal column or cylinder (to be referred to as a winding drum hereinafter) 80 having a diameter of about 100 mm are formed thread grooves 82 at the same pitch of the recording electrodes, for example, 0.125 mm. A relatively deep straight groove 84 and a relatively shallow straight groove 86 are formed by an angular interval of about 180° along the longitudinal direction of the winding drum 80 to cross the thread grooves 82. The winding drum 80 has shafts at its ends so as to be driven by a power source (not shown) in the direction indicated by arrow A1. A metal column (to be referred to as a guide screw) 88 of small diameter is also rotated at the same speed as that of the winding drum 80 in the direction indicated by arrow A2 through a transmission mechanism (not shown). Thread grooves 90 are formed on the outer circumferential surface of the guide screw 88 at the same pitch of the thread grooves 82. Wire guides 92 and 94 for guiding an electrode wire 96 are rotatably supported. An insulating film removing apparatus 98 to be used in the present invention drives an electrode wire 96 and removes the insulating film at part of the wire for a predetermined length. FIG. 12 is a schematic perspective view of the insulating film removing apparatus 98. The insulating film removing apparatus 98 shown in FIG. 12 is of the type wherein the insulating film is burnt away by the flame of a small torch. A small flame 100 is obtained by burning a gas mixture of hydrogen and oxygen which is sprayed out of a nozzle 102 having a small inner diameter. A tube 104 of small diameter fitted and fixed by a bush 112 which is, in turn, fixed to an operation lever 110 rotatably supported by a pin 108 of a rotary lever 106. The rotary lever 106 also has an single-turn clutch 114 and pulley 116 an the same shaft and is intermittently driven by a power source (not shown). The pulley 116 is constantly rotated by the power source (not shown). The single-turn clutch 114 is normally in the off state, and the front end of an armature 120 of an electromagnetic solenoid 118 is fitted in the hole formed in the single-turn clutch 114. When the electromagnetic solenoid 118 is temporarily driven to disengage the armature 120 from the single-turn clutch 114, the single-turn clutch 114 is placed in the on state during one revolution, and the rotary lever 106 rotates once. One end of the tube 104 is fitted and slidably supported by a slide bush 126 which is, in turn, fixed to a pivot lever 124 rotatably supported by a pin 122. This end of the tube 104 is connected to a rubber tube 128 to be supplied with a gas mixture of hydrogen and oxygen from a gas source (not shown).

The mode of operation of the insulating film removing apparatus 98 of the construction as described above will now be described with reference to FIG. 12.

The small flame 100 prior to the insulating film removing operation is at the lowermost position of a movement track 130 as shown in FIG. 12. Meanwhile, the electrode wire 96 from which the insulating film must be removed is travelling at a predetermined speed in a direction indicated by arrow while keeping a predetermined angle θ smaller than 90° with respect to the movement track 130. The pulley 116 is driven by power transmitted through a belt or chain from the power source (not shown). When the single-turn clutch 14 is triggered at a predetermined timing, the rotary lever 106 rotates once. Then, since the lower end of the tube 104 slides within the slide bush 126 and pivots transversely with the pivot lever 124, the upper end thereof moves elliptically together with the operation lever 112 and the bush 112. The small flame 100 above the nozzle 102 moves on the elliptical movement track 130 in the direction indicated by arrow. At the upper, substantially linear part of the track, the small flame crosses the electrode wire 96 at a skew angle θ to remove the insulating film on the wire. The speed of the small flame and the angle θ of the small flame with respect to the electrode wire are suitably selected so that the insulating film may be removed for a desired length without the electrode wire being melted.

A further description will be made referring back to FIG. 11. A tension control mechanism 132 for the electrode wire shown in FIG. 11 is incorporated for damping, at a constant torque with a hysteresis brake or the like, the rotation of the winding drum 80 on which several turns of the electrode wire are wound. The mechanism 132 is thus used for correctly winding the electrode wire 96 on the winding drum 80. The tension control mechanism 132, the insulating film removing apparatus 98, and the wire guides 92 and 94 are arranged on a table 134. This table 134 is provided so as to be movable parallel (e.g., direction indicated by arrow B) to the longitudinal direction of the winding drum in synchronism with the rotation of the winding drum 80 by driving a feed screw 136 by a power source (not shown). Wire guides 138, 140 and 142 are used to guide and switch the travelling direction of the electrode wire 96 and are rotatably supported. A buffer roll 144 is rotatably supported by a buffer lever 148 which is supported to be pivotal about a pin 146. The buffer roll 144 adjusts the tension acting on the electrode wire 96 which is exerted by a tension spring 150. A wire spool 152 is rotatably supported and continuously supplies the electrode wire 96.

The method for manufacturing the electrostatic recording head shown in FIG. 8 using the apparatus shown in FIG. 11 will now be described.

Figure 13:
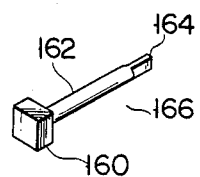
FIG. 13 is a schematic perspective view of a control electrode unit used in the electrostatic recording head shown in FIG. 8.
Figure 14:
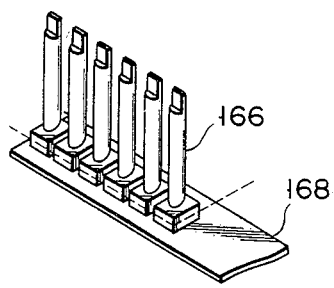
FIG. 14 is a view for explanation of a method for manufacturing an array of control electrodes used in the electrostatic recording head shown in FIG. 8.

Prior to arranging the electrode wire, one array of the control electrodes of the two arrays sandwiching the recording electrodes 32 shown in FIG. 8 is mounted on the straight groove 84 of the winding drum 80. The flexible printed circuit board shown in FIG. 9 or 10 is wound and fixed at a predetermined position of the winding drum 80. On the lands 44 and 70 of this flexible pitch circuit board is printed an epoxy resin, containing an electrically conductive adhesive such as a silver filler which has some fluidity at room temperature, to a predetermined thickness by a suitable means such as screen printing process. A control electrode unit 166 consisting of a rod-shaped portion 160 having a cross section of a predetermined area, a conductive wire portion 162 connected thereto and of smaller cross-sectional area, and a flat portion 164 for connection with the lead wire as shown in FIG. 13 is manufactured by cold working or the like of brass or phosphor bronze wire. End faces of the rod-shaped portions of a predetermined number of such control electrode units 166 are adhered or welded to a flat plate 168 at a pitch the same as that of the control electrodes, as shown in FIG. 14. An array of the control electrodes is thus obtained. After injection of an epoxy resin, the array is cut at the dotted lines to provide separate control electrodes.

According to the method wherein the control electrode units having rod-shaped portions at least at one ends thereof are arranged on and adhered to a flat plate and then injected with a resin, the number of manufacturing steps is significantly reduced than with the conventional method wherein a square bar is sliced to provide control electrode elements. Therefore, an inexpensive electrostatic recording head may be manufactured. With a control electrode unit which has a lead-wire connecting portion in addition to the rod-shaped portion, the lead wire may be connected to the lead-wire connecting portion extending from the rod-shaped portion. Therefore, connection of the lead wire is easier than with the unit in which the lead wire must be connected vertically to the flat surface.

The electrode wire 96 is supplied from the wire spool 152 and passed through the wire guide 142 and 140, the buffer roll 144, and the wire guide 138. One end of the electrode wire 96 is fixed near the thread groove 82 of the winding drum 80 through the tension control mechanism 132, the insulating film removing apparatus 98, and the guide screw 88. The winding drum 80 and the guide screw 88 are rotated at the same speed in the direction indicated by arrow in this condition, and the table 134 is moved in synchronism with this rotary movement. The insulating film removing apparatus 98 operates for every revolution of the winding drum 80 so that the parts of the electrode wire 96 from which the insulating film is removed may be brought into contact with the lands 44 and 70 of the flexible printed circuit board. In this manner, a predetermined tension is exerted on the electrode wire 96 by the tension control mechanism 132, the insulating film at a predetermined portion of the wire is removed, and the wire is guided by the guide screw 88 to be wound on the screw grooves 82 of the winding drum 80. During this winding operation, all the electrode wires 96 for the recording electrodes are connected to the flexible printed circuit board. This will be described in further detail with reference to FIG. 15.

Figure 15:
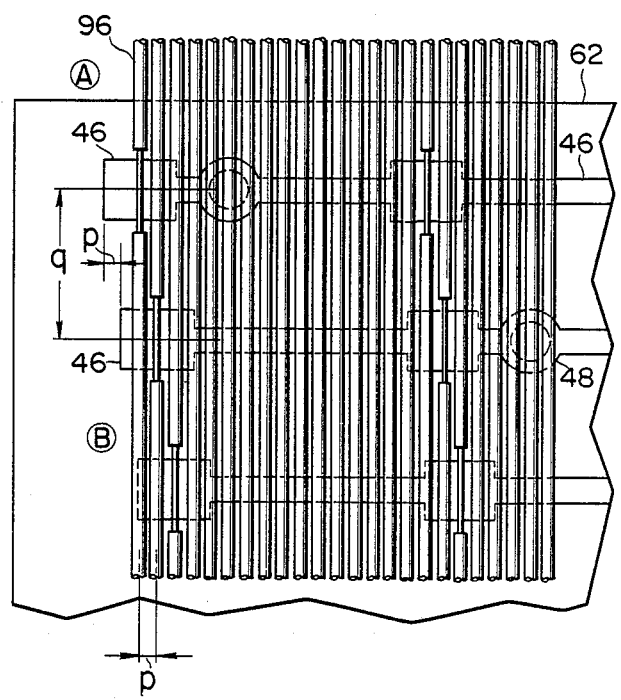
FIG. 15 is a view for explanation of a method for manufacturing the electrostatic recording head shown in FIG. 8.

FIG. 15 shows part of the flexible printed circuit board 62. Reference numerals 96, 44 and 46 respectively denote the electrode wire, the electrode wire connecting lands, the conductors for matrix wiring of the lands. The electrode wires 96 wound around the winding drum 80 are arranged at a pitch p same as that of the recording electrodes, and cross the electrode wire connecting lands 44 which are formed in an orderly manner on the flexible printed circuit board 62. The insulating film of the electrode wire 96 is removed at positions corresponding to the electrode wire connecting lands by the insulating film removing apparatus 98. Specifically, the insulating film of the first electrode wire 96 is removed in correspondence with a land Ⓐ. The insulating film of the second electrode wire 96 is removed at a distance q from the removed portion of the first electrode wire in correspondence with a land Ⓑ. The land Ⓑ at a distance q from the land Ⓐ. The lands are staggered by a distance q which is the same as the pitch of the recording electrodes so that the electrode wires to be connected are constantly positioned at the centers thereof. In the same manner, the portions of the electrode wire from which the insulating film is removed and the lands are arranged in correspondence with each other.

As has been described above, on the lands 46 is applied the electrically conductive adhesive in advance. The electrode wires from which the insulating film has been removed are rendered electrically conductive and mechanically strong after heating and hardening. Specifically, the electrical connection between the electrode wires and the lands is accomplished with an electrically conductive adhesive applied to certain portions of the lands or by low-temperature soldering. The electrically conductive adhesive is, for example, an epoxy resin containing a silver filler. After heating and hardening, the adhesive achieves electrical conduction and mechanically fixes the electrode wires 96 to the printed circuit board 62. Although the electrically conductive adhesive covers adjacent wires, these wires may not be electrically connected to the electrode wire connecting land nearby since these wires are still covered with the insulating film. Therefore, only the electrode wires from which the insulating film has been removed in correspondence with the lands are electrically connected therewith. A solder to be used in this case is a solder which melts at a temperature at which the insulating film may not melt and serves the same purpose as the electrically conductive adhesive. It is also possible to select the electrode wires and directly connect the selected electrode wires to the lands by a welder which uses a laser.

When the electrode wires are arranged to constitute all the recording electrodes 32 of the electrostatic recording head shown in FIG. 8, the winding drum 80 and the table 134 stop rotating and the insulating film removing apparatus 98 stops operating. The electrode wire 96 is cut and the terminal end thereof is fixed to the winding drum. Thereafter, the winding drum 80 is removed from the apparatus shown in FIG. 11. Molds having grooves corresponding to the depths of the grooves 84 and 86 are mounted to the winding drum 80. An epoxy resin is injected into the molds to form the electrode retainer 38 shown in FIG. 8 at the part corresponding to the relatively deep straight groove 84 and to form the electrode wire terminal end retainer 40 at the part corresponding to the relatively shallow straight groove 86. The array of the control electrodes shown in FIG. 14 is mounted to a predetermined position of the mold for the relatively deep straight groove 84 for the purpose of forming the other array of control electrodes as in the case of the groove 84 prior to the winding operation described above.

The winding drum 80 after molding is heated at a predetermined temperature for a predetermined period of time and is thereafter cooled. By this heat treatment, the electrode wires and the control electrodes are formed integrally with each other. Simultaneously, the electrically conductive adhesive applied on the electrode wire connecting lands of the flexible printed circuit board is hardened to securely fix the electrode wires and to electrically connect the lands with the electrode wires. After unnecessary portions of the electrode wires are cut away and the molds and winding drum are removed, the electrode retainer 38 and the electrode wire terminal end retainer 40 are machined to predetermined sizes. An insulator such as a resin is applied to the surface of the electrode wire terminal end retainer 40 to which the end faces of the electrode wires are exposed, thereby completely insulating and embedding the ends of the electrode wires. The flexible printed circuit board 62 to which are fixed the electrode wires 36 constituting the recording electrodes 32 is integrally formed, by welding by soldering or adhesion with an electrically conductive adhesive, with the rigid printed circuit board 64 having the lead wire connecting lands for the control electrodes 34 and the connectors 74 for connection with the drive circuit (not shown) for driving the electrodes. The lead wires 54 are suspended between flat portions 164 (FIG. 13) of the control electrodes and the rigid printed circuit board 64, and soldered to provide the electrostatic recording head as shown in FIG. 8. Although not shown, the electrode retainer 38 and the rigid printed circuit board 64 of the electrostatic recording head are fixed by metal members and covered, and are thereafter assembled in an electrostatic recording apparatus such as a facsimile.

Various other changes and modifications may be made within the spirit and scope of the present invention.

What we claim is:

1. An electrostatic recording head comprising:
   a plurality of recording electrode wires arranged in parallel with constant intervals therebetween in a first plane, each of said recording electrode wires having one end surface establishing a recording head electrode and being coated with a meltable insulating layer with part of said meltable insulating layer being melted;
   a plurality of control electrode wires arranged in parallel at constant intervals therebetween in a second plane, said second plane being parallel and close to said first plane of said recording electrode wires, said intervals of said control electrode wires being greater than said intervals of said recording electrode wires, each of said control electrode wires having one end surface establishing a control electrode, and said control electrodes and recording head electrode defining a third plane; and
   a printed circuit board including a plurality of printed lands connected to the respective recording electrode wire at said part of said meltable insulting layer which is melted, a plurality of printed conductors for connecting those printed lands which are connected to every predetermined number of recording electrode wires, and connectors each of which is connected to a respective one of said printed conductors.

2. An electrostatic recording head according to claim 1, wherein said printed lands are arranged in a matrix form on said printed circuit board, with said predetermined number being as the number of rows of the matrix, in such a manner that with lands in each row are staggered by a pitch of said electrode wires from the corresponding lands in the adjacent row, said rows of the matrix being parallel to said recording electrode line.

3. An electrostatic recording head according to claim 2, wherein said lands in each row are connected through said printed conductors.

4. An electrostatic recording head according to claim 2, wherein every other one of said lands in each row is connected through said printed conductors.

5. An electrostatic recording head according to claim 1, wherein said printed circuit board comprises a first section on which said lands are provided and a second section on which said connectors are provided.

6. An electrostatic recording head according to claim 5, wherein said first section and said second section are rigid printed circuit boards.

7. An electrostatic recording head according to claim 5, wherein said first section is a flexible printed circuit board and said second section is a rigid printed circuit board.

* * * * *